May 17, 1960
G. E. SUDEROW
2,936,592
CAISSON AND DETACHABLE PONTOON ASSEMBLY
FOR FLOATING BARGES AND THE LIKE
Original Filed July 8, 1954
5 Sheets-Sheet 2
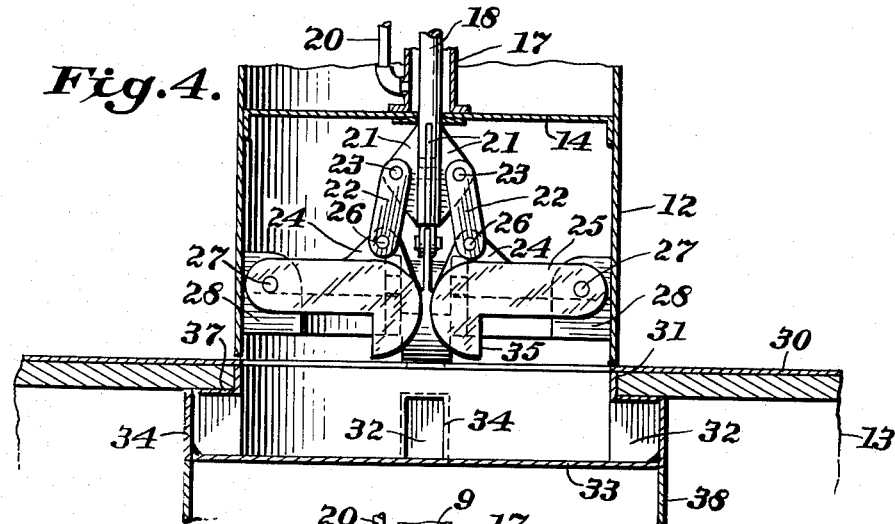
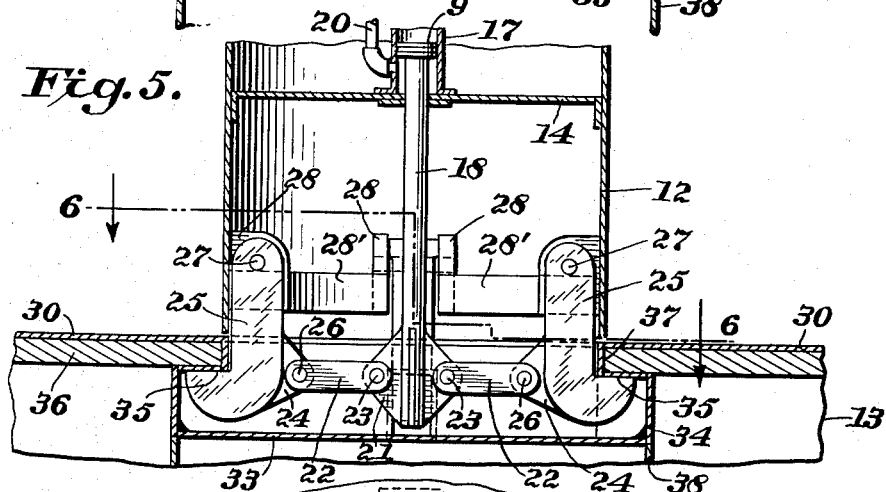
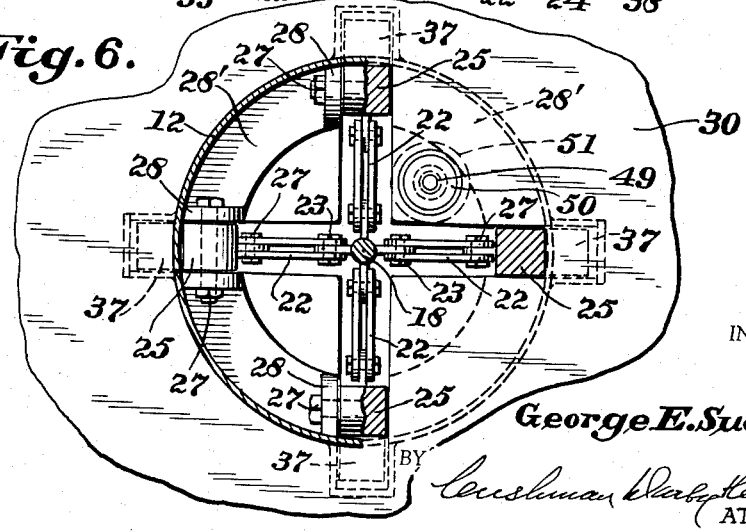
INVENTOR:
George E. Suderow,
BY Cushman, Darby Cushman
ATTORNEYS.

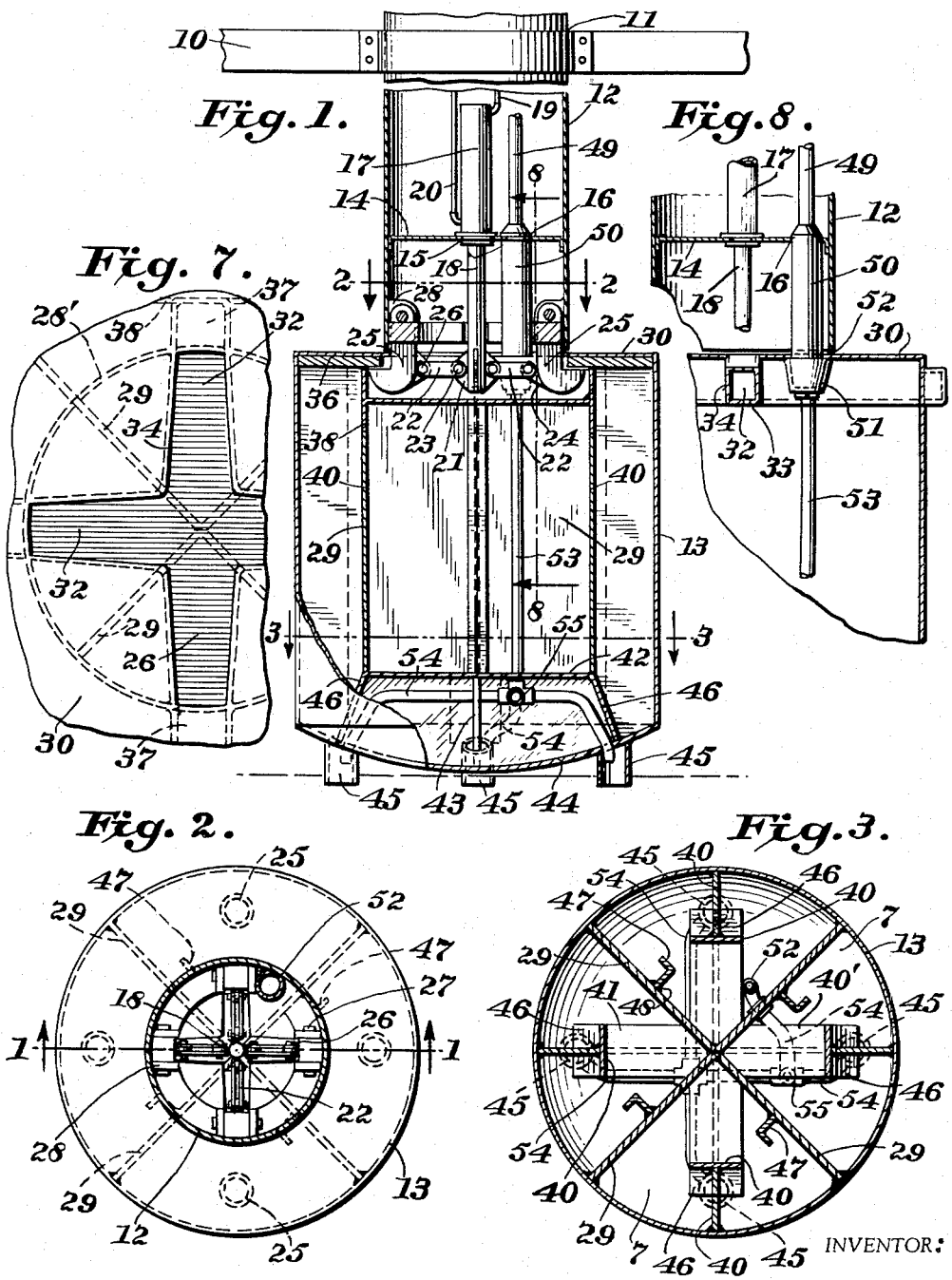
May 17, 1960 G. E. SUDEROW 2,936,592
CAISSON AND DETACHABLE PONTOON ASSEMBLY
FOR FLOATING BARGES AND THE LIKE
Original Filed July 8, 1954 5 Sheets-Sheet 1
INVENTOR:
George E. Suderow,
BY
ATTORNEYS.

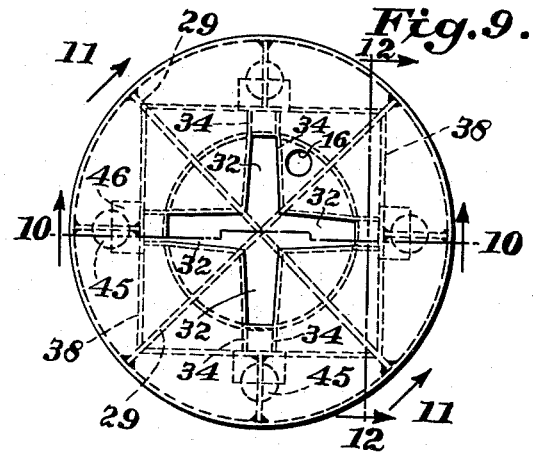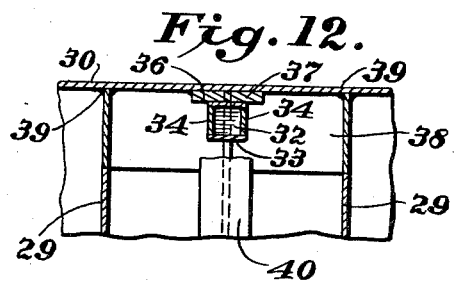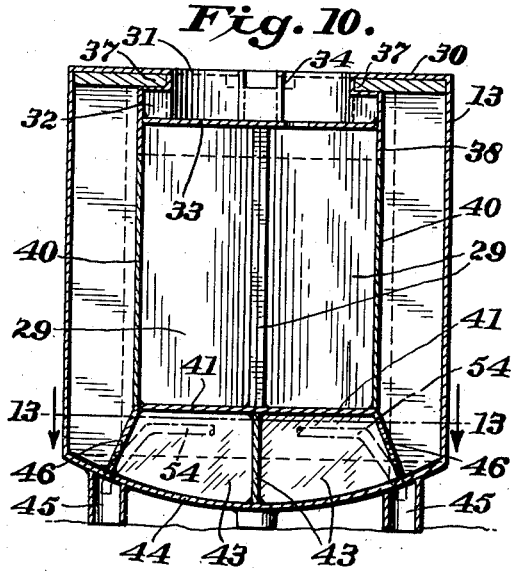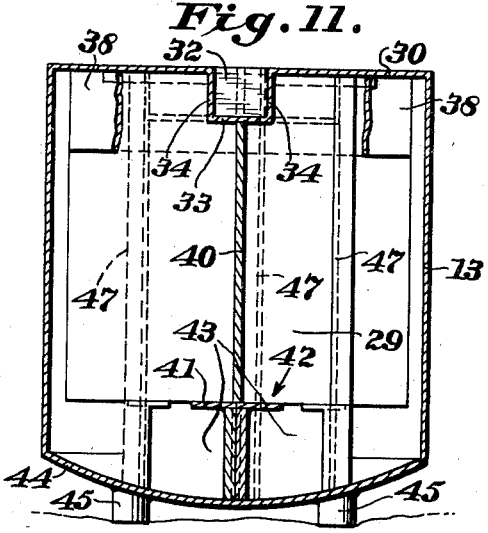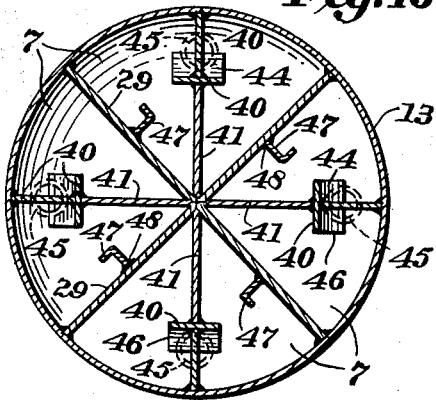

May 17, 1960  G. E. SUDEROW  2,936,592
CAISSON AND DETACHABLE PONTOON ASSEMBLY
FOR FLOATING BARGES AND THE LIKE
Original Filed July 8, 1954  5 Sheets-Sheet 4

INVENTOR:

George E. Suderow,

BY
ATTORNEYS.

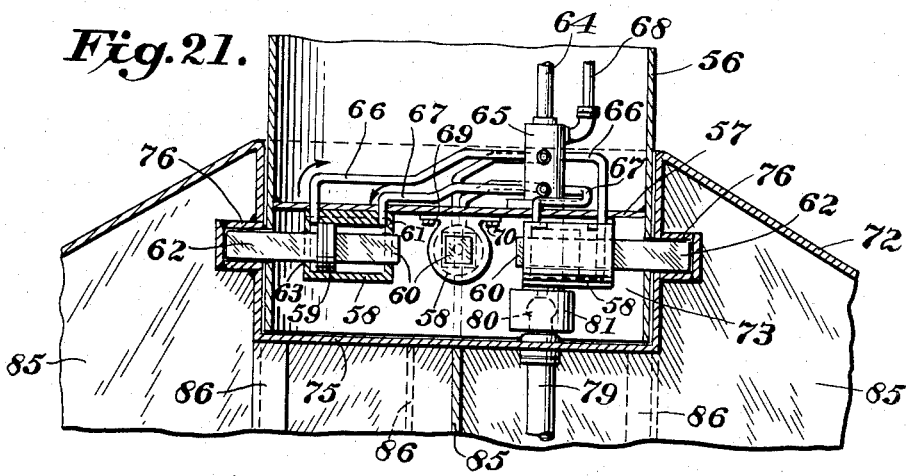

United States Patent Office 2,936,592
Patented May 17, 1960

2,936,592

CAISSON AND DETACHABLE PONTOON ASSEMBLY FOR FLOATING BARGES AND THE LIKE

George E. Suderow, New York, N.Y., assignor to DeLong Corporation, New York, N.Y., a corporation of Delaware Continuation of application Serial No. 442,110, July 8, 1954. This application November 29, 1956, Serial No. 625,576

14 Claims. (Cl. 61—46.5)

The present invention relates to a combined floating barge and platform assembly for use in subaqueous operations, and more particularly, to improved means for detachably connecting the lower ends of caissons or tubular supporting members, carried by the barge, to pontoons or tanks so as to provide detachable wide bearing surfaces or foundation footage for supporting the barge or working platform when the same is raised above the water and the pontoons are moved into engagement with the marine ground. This application is a continuation of my copending application, Serial No. 442,110, filed July 8, 1954, now abandoned.

An important object consists in providing each of the caissons with movable locking members arranged releasably to engage a pontoon or tank and which is operable by means positioned remote from the pontoon, when the latter is submerged to engage the marine ground.

Another object consists in providing remote control means for detachably connecting the pontoons or tanks to the caissons, so that each pontoon may be abandoned and left submerged when it is held fast or embedded in the subaqueous ground.

A still further object consists in associating with each tank or pontoon, spaced jet nozzles extending from the bottom of the tank and detachably communicating with suitable fluid pressure means so as to facilitate freeing of the tank from the submerged bottom. Thus, it will be seen that should the tank be so embedded into the ground as to make removal thereof difficult and expensive, the tank may be abandoned due to the releasable connection of the caisson therewith.

Other objects and advantages of the invention will become apparent from the following description when taken in conjunction with the accompanying claims and drawings.

Referring to the drawings, in which are shown several preferred embodiments the invention may assume:

Figure 1 is a detailed, vertical, sectional view showing the releasable means for detachably connecting a caisson to a pontoon or tank and with the locking members in their operative position, also the movable connection of the caisson with the deck or working platform of the barge;

Figure 2 is a sectional view taken substantially along the line 2—2 of Figure 1;

Figure 3 is a sectional view taken substantially along the line 3—3 of Figure 1;

Figure 4 is an enlarged, detailed, vertical, sectional view showing the movable locking members in their retracted position;

Figure 5 is a view similar to Figure 4 showing the movable members in their locked position;

Figure 6 is a sectional view taken substantially along the line 6—6 of Figure 5;

Figure 7 is a detailed plan view with parts removed and showing the top of a tank with the caisson removed therefrom;

Figure 8 is a sectional view taken substantially along the line 8—8 of Figure 1, with parts omitted;

Figure 9 is a detailed plan view of a tank;

Figure 10 is a sectional view taken substantially along the line 10—10 of Figure 9;

Figure 11 is a sectional view taken substantially along the line 11—11 of Figure 9;

Figure 12 is a sectional view taken along the line 12—12 of Figure 9 and looking in the direction of the arrows;

Figure 13 is a sectional view taken substantially along the line 13—13 of Figure 10;

Figure 14 is a detail perspective view, with parts in section, of a portion of the tank;

Figure 19 is a sectional view taken substantially along the line 19—19 of Figure 17;

Figure 20 is a sectional view taken substantially along the line 20—20 of Figure 17;

Figure 21 is a sectional view showing the means for releasably connecting the caisson to the tank in their locked position; and Figure 22 is a view similar to Figure 21 but showing the locking means released.

Figure 16:
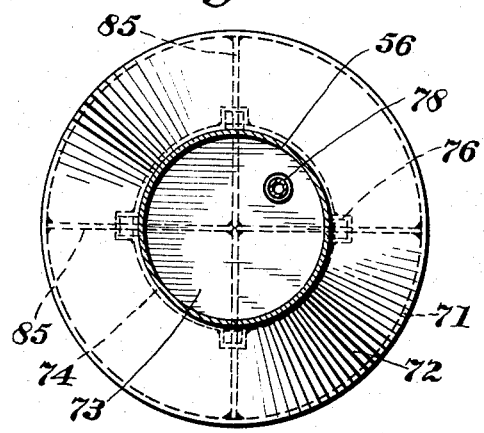
Figure 16 is a sectional view taken substantially along the line 16—16 of Figure 15.

Referring to the drawings, 10 conventionally indicates the deck or working platform of a floating barge (Fig. 1) which may be provided with a plurality of spaced guide openings 11 through each of which is arranged to movably extend a caisson or tubular member 12 so as to be operable by means of a suitable jack mechanism, such as disclosed in the copending Pointer application, Serial No. 283,567, filed April 22, 1952, now Patent No. 2,775,869, dated January 1, 1957. In order to provide additional footage and a firm wide bearing surface for supporting the load when the barge or platform 10 is jacked clear of the water, a rigid durable metal pontoon or tank 13 is arranged to be detachably connected to the lower end of the caisson 12 in such a manner, that if the tank 13 should be so embedded or stuck into the marine ground as to be held fast therein and cannot easily be withdrawn with the caisson 12, remote control means are provided for controlling the detachable connecting of each caisson 12 with its associated tank 13. For this purpose, each of the caissons or tubular members 12 has mounted therein adjacent the lower end thereof, a transverse base or supporting disc 14 provided with a central opening 15 and an offset opening 16 (Fig. 1). Extending through the opening 15 and mounted on the base 14 is an elongated cylinder 17 in which is reciprocally mounted a piston 9 having a stem or rod 18 (Figure 5). A combined fluid pressure inlet and outlet pipe 19 communicates with one end of the cylinder 17 and a combined inlet and outlet fluid pressure pipe 20 communicates with the opposite end thereof so as to control the reciprocating movement of the piston 9. The pipes 19 and 20 communicate with any suitable source of fluid pressure, such as air or water, not shown, and which preferably is positioned on the deck 10 at a point remote from the tank 13. The lower, outer end of the piston rod 18 has extending radially therefrom four uniformly spaced webs or flanges 21, to each of which is pivotally connected a pair of spaced links 22 at their inner ends as at 23 (Figure 4). Each pair of links 22 is also pivotally connected to the lug 24 of a locking jaw or member 25 as at 26. Each of the jaws 25 is pivoted at its outer end as at 27 to a lug 28 extending inwardly from the inner surface of the caisson 12. The adjacent pair of lugs 28 may be connected by segmental reinforcing plates or straps 28' (Figure 5) which engage the inner wall of each of the caissons 12 so as to reinforce the lower end portion of the same.

Each pontoon or tank 13 is preferably of cylindrical shape and is provided with four diametrically extending partitions or bulkheads 29 (Figure 13) which extend from the top to the bottom of the tank. The top 30 of the tank has a central opening 31 (Figure 10) which is formed with four communicating radial slots 32 by the horizontal flat plates 33 (Figure 12) and the spaced, vertical plates 34 so arranged as to provide the intersecting slots 32 (Figure 7) disposed substantially at right angles to adjacent slots. These slots are so shaped and positioned as to receive the locking jaws 25 when the latter are moved from their retracted position, as shown in Figure 4, to their locking position, as shown in Figure 5. Each of the jaws 25 has a flat shoulder portion 35, and the top 30 of the tank is provided with thick reinforcing plates 36 that fit within the slots 32. The wall of the opening 31 and the plates 36 extend inwardly so as to overlap a portion of the slots as at 37 and provide locking lugs engageable with the jaws 25. When the caisson 12 is in alignment with the opening 31 of the tank and the jaws are in their retracted position (Figure 4), upon the actuation of the links 22 by the downward movement of the piston 9, the flat shoulders 35 of the jaws 25 will be moved to engage the underside of the portions 37 of the top in order to firmly and securely lock each caisson 12 to its associated tank 13 (Figure 5).

The adjacent bulkheads 29 and the vertical plates 34 are suitably connected to plates or webs 38 that extend between adjacent bulkheads 29 and close the outer ends of the slots 32 to make the tank watertight. The plates 38 may be welded to the bulkheads 29 and the top 30, as at 39 (Figure 12). The bulkheads 29 are coextensive in length with the interior of the tank and are cut away or slotted to allow the insertion of such parts as the plates 32, 34, and 38 to which they are connected to provide a firm, rigid, and durable watertight structure capable of withstanding the pressure and strains to which a device of this character is normally subjected.

Circumferentially spaced substantially T-shaped vertical plates or webs 40 extend radially from the inner side wall of the tank 13 between the bulkheads 29 (Figure 3). The plates 40 may be welded or otherwise connected to the inner wall of the tank 13, the top 30, and the annular depending plate 38. Additionally, the plates 40 at their lower ends are connected to or engage the radial arms 41 of a transverse member 42 which has depending vertical cross webs 43 (Figure 14) shaped to rest on the curved bottom 44 of the tank. The arms 41 terminate in inclined depending end portions or chocks 46 which are positioned adjacent the spaced jet discharge nipples 45 that extend downwardly from the curved bottom 44 and may be welded or otherwise connected thereto. One or more nipples 45 may be provided. Vertically disposed angle members 47 may be welded as at 48 to the bulkheads 29 and to the bottom and top of the tank 13 to stiffen or reinforce the same, in order that the tanks 13 may be capable of withstanding the heavy load to which they are subjected when the barge or working platform 10 is raised above the level of the water and is supported directly by the caissons and the tanks 13.

A fluid pressure pipe 49 (Figure 8) is provided with a nozzle housing 50 which extends through the offset opening 16 and is arranged to be removably inserted into a similarly shaped, fixed, tapered nozzle receptor 51 that registers with the offset opening 52 formed in the top 30 of the tank. Extending downwardly from the receptor 51 is a fixed distributing pipe 53 that communicates with each of the jet nozzles 45 through the branch pipes 54 connected by the fitting 55 (Figure 1) to the lower end of the pipe 53. When connecting the caisson 12 to its associated tank 13, the releasable locking mechanism is properly aligned with the slots 32 and the nozzle housing 50 is then moved into registration and through the opening 52 into the receptor 51.

It will be seen that the nozzle housing 50 is movable with the caisson 12 so that when the clamping jaws 25 are aligned with the slots 32, the nozzle housing 50 will register with the opening 52 in the tank, so that when the jaws 25 are moved into clamping engagement with the underside of the top 30 of the tank, the tapered outer end of the housing 50 will be moved into tight frictional engagement with the complementary inner wall of the receptor 51 to form a tight seal therewith.

When the parts are in the position as shown in Figure 8 and the tank is engaged or embedded in the marine ground, fluid pressure such as air or water from a suitable source may be introduced into the pipe 49, from where it is conducted by the pipe 53 to the branch pipes 54 that extend into the nozzles 45 through openings in the bottom 44, so as to release the tank from its submerged position. The jet nozzles 45 also serve to provide firm bearing feet for maintaining the tank on hilly or uneven marine ground and are cut off from communication with the interior of the tank 13. If the tank 13 cannot be released from the marine bottom or ground, the caisson 12 may be disconnected from the tank by withdrawing the clamping jaws 25 from engagement with the top of the tank and the plates 36.

In operation, the marine vessel such as a combined floating barge and working platform to be used in subaqueous operations, is provided with a plurality of tubular caissons 12 which extend through suitable openings 11 in the deck 10 of the barge, and carry with them the tanks or pontoons 13 which are connected by reason of the engagement of the clamping jaws 25 with the underside of each of the tops of the tanks. The caissons and tanks are carried in their retracted position to where the drilling operation is to take place. When the barge reaches this location, the caissons 12 and tanks 13 are lowered until the tanks engage the marine ground. By reason of the concavity of the bottom of each of the tanks and the depending jet nipples 45, each tank is firmly maintained in a fixed position irrespective of the irregularity of the terrain so as to provide a firm supporting foundation. The working platform or deck 10 of the barge may then be raised above the water level by the jack mechanism such as disclosed in the said Pointer application, Serial No. 283,567. When the drilling operation is completed, air under pressure may be introduced into the pipe 49 which communicates through the pipe 53 with the branch connections 54 so as to release the bottom of each of the tanks 13 from the marine ground. If, for any reason, a tank cannot be so freed, the piston 9 is operated by actuating a suitable control valve at a point remote from the tank so as to withdraw the jaws 25 from engagement with the underside of the top of the tank so that these jaws now assume their retracted position, as shown in Figure 4. The caisson 12 may then be removed from the tank at the same time the housing 50 is moved away from the tapered receptor 51.

Figure 18:
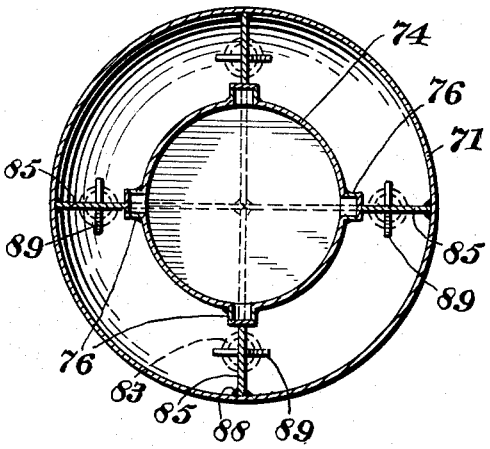
Figure 18 is a sectional view taken substantially along the line 18—18 of Figure 17.
Figure 15:
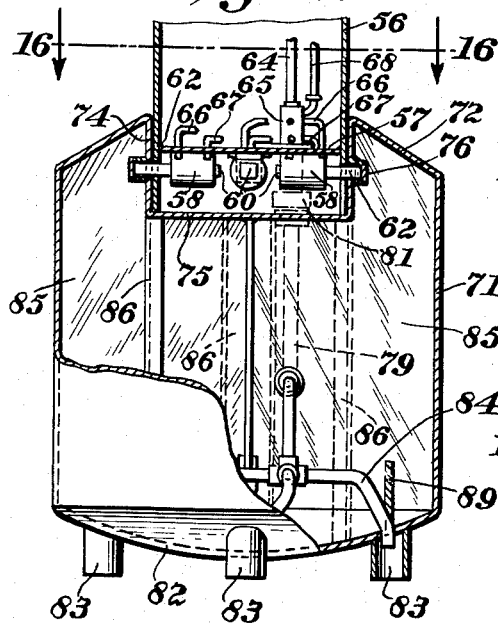
Figure 15 is a side view with parts in section of a modified form of the invention.
Figure 17:
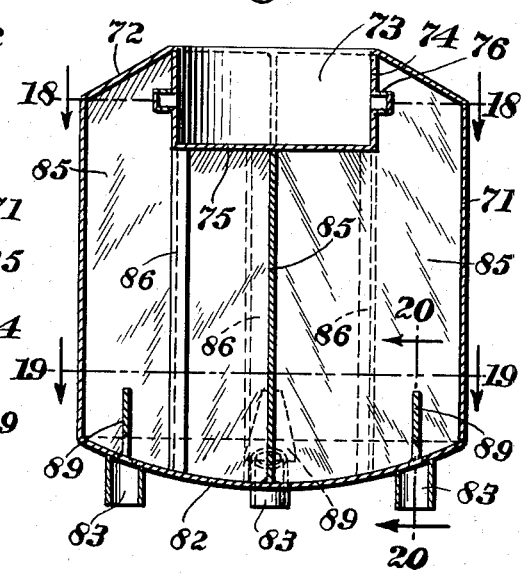
Figure 17 is a detailed, vertical, sectional view of the tank shown in Figure 15 but with the pontoon removed therefrom.

In the modified form of the invention shown in Figures 15 to 21, inclusive, each of the tubular caissons or columns 56 is provided adjacent its lower end with a transverse plate or disc 57 (Figure 15), to the underside of which are connected spaced fluid pressure cylinders 58. Preferably four of these cylinders are provided and are disposed substantially 90° apart. In each of the cylinders 58 is mounted a reciprocating piston 59 (Figure 21) having a rod or stem 60 extending axially of the cylinder and through an opening 61 in the rear wall thereof. A reciprocating locking plunger or pin 62 extends outwardly from the opposite side of the piston 59 and through an opening 63 in the front end of the cylinder. A fluid pressure pipe 64 communicates at its lower end with a distributing housing 65 which in turn communicates through the pipes 66 with the front of the cylinders 58 and through the pipes 67 with the rear of each cylinder so that each piston 59 is positioned between a pair of pipes. A combined inlet and exhaust pipe 68 extends outwardly from the housing 65 so as to control the flow of the fluid into and out of each cylinder. As shown, each of the cylinders 58 is connected by a bracket 69 (Figure 22) to the underside of the plate 57 through the bolts 70. However, any other suitable means may be used for maintaining the cylinders and their associated parts in proper position within the caisson.

A tank or pontoon 71 is arranged to be detachably connected to each caisson 56 so as to furnish an additional supporting foundation for the assembly in order to maintain the working platform and its associated parts above the water level during the drilling or other operation with which the assembly is used. The top 72 of the tank 71 is provided with a central opening or recess 73 that is formed with the depending side walls 74 and the bottom 75 which is shaped to conform with the shape and size of the caisson 56 so that the latter may be freely inserted therein. The side walls 74 are radially offset as at 76 to provide sockets or notches 77 for releasably receiving the locking pins 62 that are operable by the pistons 59. The walls 74 and 75 together with the closed notch 77 provide a watertight recess 73 for releasably receiving the caisson 56. The bottom 75 of the recess 73 is provided with an offset opening 78 (Figure 16) through which extends a fluid pressure pipe 79 (Figure 21) that has a tapered nozzle end 80 arranged to be removably inserted into a complementary opening in a fluid supply casing 81 that communicates with a suitable source of fluid pressure such as water, air, or gas, in a manner similar to the pipe 49 previously described. The bottom 82 of the tank 71 is convex and has extending outwardly and downwardly therefrom spaced jet nipples 83 to which fluid under pressure is delivered through the branches 84 of the pipe 79 so as to facilitate the release of the tank from the marine ground.

The inside of the tank 71 is provided with the diametrically disposed bulkheads or reinforcing partitions 85 (Figure 18) which separate the same into four compartments. The bulkheads 85 extend from the bottom to the top of the tank and may be reinforced by the angle bars 86 which are welded thereto as at 87. The bulkheads are connected to the inner wall of the tank and to the wall of the recess 73 at suitably spaced points by the welding as at 88 so as to provide watertight compartments. The lower ends of the bulkheads adjacent the nipples 83 may be provided with reinforcing webs or pins 89 (Figure 19).

In operation, the tanks 71 are normally connected to the caissons 56 by reason of the locking engagement of the pins 62 with their aligned sockets 77 (Figure 22). The caissons and tanks in their raised position are carried by the barge to the point of operation, and then are lowered so that the tanks or pontoons 71 are moved into firm engagement with the ground, so as to be capable of supporting the load of the barge or working platform and their associated parts, when they are raised above the water level to carry out the drilling or other subaqueous operation.

When it is desired to release the tank 71 from the marine bottom, the air or liquid under pressure is introduced through the pipes 79 and the branch connections into the nipples 83 so as to loosen the engagement of the tank with the ground and then the caisson and tank are raised to their inoperative position in any suitable manner such as by the jack mechanism as disclosed in said Pointer application, Serial No. 283,567. If for any reason a tank 71 cannot be withdrawn from the marine ground, then the pistons 59 are actuated so as to move the pins 62 to their retracted positions as particularly shown in Figure 22, so that the caisson 56 may be withdrawn and the tank 71 allowed to remain in the ground.

It will be manifest that any number of caissons and tanks may be employed in order to firmly maintain the working platform and its associated parts above the water level during the particular marine operation with which the device is used. Further, it will be seen that any suitable fluid pressure such as water, air, or gas may be used for actuating the pistons, or mechanical means may be provided for this purpose.

The thick reinforcing plate 36 on the underside of the top of the tank tends to provide means for preventing deformation or weakening of the top of the tank when raising the same. The sockets 77 and the walls of the recess are watertight (Figure 22) so as to accommodate the reciprocating locking pins 62. Thus, it will be seen that in all forms of the invention, releasable means are provided to give additional, firm supporting footage to the caissons when they are bearing the load of the superstructure. In other words, the tanks or pontoons constitute a stable base for supporting the working platform and its associated parts when they are raised and maintained in a fixed position above the water level.

It will be understood that the forms of the invention shown are merely illustrative of preferred embodiments, and that such changes may be made as come within the purview of the following claims.

I claim:

1. In combination with a floating barge, a caisson movably connected to the barge for supporting the same above the water, a ground-engaging pontoon, locking means for releasably connecting the pontoon to the lower end of said caisson, said locking means including spaced members movably mounted in said lower end, said pontoon being provided with means for releasable engagement with said movable members to lock said caisson to said pontoon, and means controllable from said barge and operatively connected to said movable members for moving the same in an unlocking direction, independent of movement of said caisson, so that when said pontoon is embedded in the marine ground said caisson may be released from said pontoon upon withdrawing said movable members out of engagement with said pontoon.

2. In combination with a floating barge as called for in claim 1, in which releasable interfitting sectional means extend through said caisson and said pontoon for supplying fluid under pressure to the underside of said pontoon when the latter is embedded in the marine ground so as to release said pontoon therefrom.

3. In combination with a floating barge as called for in claim 1, in which the pontoon has a curved bottom provided with spaced jet nozzles, and the caisson and pontoon are provided with longitudinally extending interfitting supply pipes which register with each other when said pontoon is connected to said caisson, the supply pipe in said pontoon communicating with said nozzles, and means for supplying fluid under pressure through said supply pipes to said nozzles so as to facilitate the removal of said pontoon from the marine ground.

4. In combination with a floating barge, a caisson movably connected to said barge for supporting the same above the water, a ground-engaging pontoon having a recess in the top thereof, locking means for releasably connecting said caisson to said pontoon, said locking means including circumferentially spaced jaws pivotally connected to the lower end of said caisson and arranged when swung outwardly to be moved into said recess and engage the underside of the top of said pontoon, and fluid pressure means operatively connected to said jaws for actuating the same, the parts being constructed and arranged so that when said pontoon is embedded in the marine ground said caisson may be released from said pontoon upon withdrawing said jaws from engagement with said pontoon.

5. In combination with a floating barge as called for in claim 4, in which the caisson and pontoon are provided with releasable, interfitting, sectional supply pipes that extend to the undersurface of the pontoon for supplying liquid thereto when the latter is embedded in the marine ground.

6. The combination as called for in claim 4, in which the pontoon has a curved bottom provided with spaced, depending jet nozzles, and interfitting, sectional pipes extending through said caisson and said pontoon for supplying fluid under pressure to the undersurface of said pontoon when the latter is embedded in the marine ground so as to release said pontoon therefrom, and means for releasably connecting said pipe sections.

7. In combination with a floating barge, a caisson movably connected to said barge for supporting the same above the water, a ground-engaging pontoon having a recess in the top thereof for receiving the lower end of said caisson, said caisson having mounted therein outwardly and radially movable pins, the wall of said recess having openings arranged to releasably receive said pins, means for actuating said pins so as to move them into or withdraw them from said openings, the parts being constructed and arranged so that when said pontoon is embedded in the marine ground said caisson may be released from said pontoon upon withdrawing said pins from engagement with said pontoon.

8. In combination with a floating barge as called for in claim 7 in which the caisson and pontoon are provided with releasable interfitting sectional supply pipes that extend to the bottom of said pontoon for supplying fluid under pressure to the undersurface thereof when said pontoon is embedded in the marine ground.

9. In combination with a floating barge, a caisson movably connected to the barge for supporting the same above the water, a ground-engaging pontoon having a reinforced top having crossed slots therein, locking means for releasably connecting said caisson to said pontoon, said locking means including circumferentially spaced jaws pivotally connected to the lower end of said caisson and arranged when swung outwardly to be moved into said slots and engage under the ends thereof, and fluid pressure means operatively connected to said jaws for actuating the same.

10. In combination with a floating barge as called for in claim 9, in which the bottom of said pontoon is provided with spaced depending jet nipples, and the caisson and pontoon are provided with releasable, interfitting, sectional pipes which communicate with said jet nipples for supplying fluid under pressure to the undersurface of said pontoon when the latter is embedded in the marine ground so as to release the pontoon therefrom.

11. In a mobile marine structure, including a buoyant platform-like body having a plurality of upright marine-bottom-engageable legs mounted thereon for substantially vertical movement relative thereto, and power-operated means for selectively effecting or restraining said movement in either direction, the combination of an enlarged footing member for each leg; means detachably connecting said member to the lower end of the corresponding leg including at least one locking element movably mounted on the leg for engagement with said member; and means controllable from the body for operating said connecting means to move said element in an unlocking direction, independent of movement of said leg, and detach said footing member from its leg, whereby should a said member become stuck in the marine bottom it can be detached from its leg to permit withdrawal of the latter.

12. The structure defined in claim 11 including generally-downwardly directed nozzle means on the underside of each footing member, conduit means extending from the body through the corresponding leg and member to the nozzle means for supplying the latter with fluid under pressure, and a pull-releasable coupling in said conduit means between the corresponding leg and footing member.

13. The structure defined in claim 11 including means defining a chamber substantially completely enclosing the connecting means when the member is connected to the leg.

14. The structure defined in claim 11 in which the controllable means includes a fluid pressure motor.

References Cited in the file of this patent

UNITED STATES PATENTS

| | | |
|---|---|---|
| 2,308,743 | Bulkley et al. | Jan. 19, 1943 |
| 2,316,199 | Vetter | Apr. 13, 1943 |
| 2,535,856 | Luertzing | Dec. 26, 1950 |
| 2,607,198 | Parks | Aug. 19, 1952 |
| 2,637,172 | Howard | May 5, 1953 |
| 2,647,789 | Chayne | Aug. 4, 1953 |
| 2,661,600 | Hopkins | Dec. 8, 1953 |
| 2,771,747 | Rectin | Nov. 27, 1956 |